US012802491B2

(12) United States Patent
Babazaki

(10) Patent No.: US 12,802,491 B2
(45) Date of Patent: Nov. 17, 2026

(54) INFORMATION PROCESSING DEVICE, INFORMATION PROCESSING METHOD, AND STORAGE MEDIUM

(71) Applicant: NEC Corporation, Tokyo (JP)

(72) Inventor: Yasunori Babazaki, Tokyo (JP)

(73) Assignee: NEC CORPORATION, Tokyo (JP)

( * ) Notice: Subject to any disclaimer, the term of this patent is extended or adjusted under 35 U.S.C. 154(b) by 218 days.

(21) Appl. No.: 18/716,185

(22) PCT Filed: Dec. 14, 2021

(86) PCT No.: PCT/JP2021/045988
§ 371 (c)(1),
(2) Date: Jun. 4, 2024

(87) PCT Pub. No.: WO2023/112128
PCT Pub. Date: Jun. 22, 2023

(65) Prior Publication Data

US 2025/0037504 A1 Jan. 30, 2025

(51) Int. Cl.
*G06V 40/20* (2022.01)

(52) U.S. Cl.
CPC .................................... *G06V 40/20* (2022.01)

(58) Field of Classification Search
None
See application file for complete search history.

(56) References Cited

U.S. PATENT DOCUMENTS

| | | | | |
|---|---|---|---|---|
| 10,482,321 B2 * | 11/2019 | Kusens | .................. | G06V 40/23 |
| 12,087,059 B1 * | 9/2024 | Gordon | .................. | G06V 20/52 |
| 2009/0232353 A1 * | 9/2009 | Sundaresan | ............. | G06T 7/251 |
| | | | | 348/42 |
| 2011/0044536 A1 * | 2/2011 | Cobb | .................. | G06V 10/507 |
| | | | | 382/165 |

(Continued)

FOREIGN PATENT DOCUMENTS

| | | |
|---|---|---|
| JP | 2018-206321 A | 12/2018 |
| JP | 2019-079357 A | 5/2019 |

(Continued)

OTHER PUBLICATIONS

International Search Report for PCT Application No. PCT/JP2021/045988, mailed on Feb. 8, 2022.

(Continued)

*Primary Examiner* — Sath V Perungavoor
(74) *Attorney, Agent, or Firm* — Sughrue Mion, PLLC

(57) ABSTRACT

To achieve an object to provide a technique for recognition processing that is robust against information loss, an information processing apparatus includes: extraction means (11) for extracting a plurality of pieces of instance information for each of at least one instance included in an input video; aggregation means (12) for aggregating the plurality of pieces of instance information for each instance; integration means (13) for integrating, for each instance, the plurality of pieces of instance information aggregated by the aggregation means (12), to generate instance integrated information; and recognition means (14) for generating a recognition result on at least one of the at least one instance with reference to the instance integrated information generated by the integration means (13).

11 Claims, 13 Drawing Sheets

(56) References Cited

U.S. PATENT DOCUMENTS

| | | | | |
|---|---|---|---|---|
| 2012/0327194 | A1* | 12/2012 | Shiratori | G06F 3/011<br>348/47 |
| 2019/0138811 | A1* | 5/2019 | Sohn | G06V 20/41 |
| 2019/0318194 | A1* | 10/2019 | Liu | G06N 3/08 |
| 2020/0074280 | A1* | 3/2020 | Meier | G06T 7/70 |
| 2020/0193671 | A1* | 6/2020 | Tamir | G06T 7/251 |
| 2020/0211154 | A1* | 7/2020 | Ng | A61B 5/1128 |
| 2020/0327465 | A1* | 10/2020 | Baek | G06N 3/08 |
| 2022/0058381 | A1* | 2/2022 | Ionescu | G06V 10/25 |
| 2022/0066544 | A1* | 3/2022 | Kwon | G06T 7/251 |
| 2022/0079510 | A1* | 3/2022 | Robillard | G16H 20/30 |
| 2022/0080060 | A1* | 3/2022 | Jarvis | G16H 40/67 |
| 2022/0414898 | A1* | 12/2022 | Miyake | G06V 40/23 |
| 2023/0154185 | A1* | 5/2023 | Kuen | G06V 10/751<br>382/100 |
| 2024/0135930 | A1* | 4/2024 | Chauhan | G06F 21/32 |
| 2024/0161316 | A1* | 5/2024 | Tao | G06T 7/292 |

FOREIGN PATENT DOCUMENTS

| | | | |
|---|---|---|---|
| JP | 2019-144830 | A | 8/2019 |
| JP | 2020-135747 | A | 8/2020 |
| JP | 2021-065617 | A | 4/2021 |
| WO | 2018/163555 | A1 | 9/2018 |
| WO | 2019/186676 | A1 | 10/2019 |

OTHER PUBLICATIONS

Chih-Yao Ma et. al., “Attend and Interact: Higher-Order Object Interactions for Video Understanding”, CVPR, 2018.

* cited by examiner

D1

| ATTRIBUTE | HUMAN INSTANCE INFORMATION EXTRACTION SECTION 1 | | HUMAN INSTANCE INFORMATION EXTRACTION SECTION 2 | |
|---|---|---|---|---|
| ASUKE TANAKA, OPERATOR | PERSON W | RECTANGULAR INFORMATION 1101 | PERSON W1 | POSE INFORMATION 1111 |
| BO SATO, OPERATOR | PERSON X | RECTANGULAR INFORMATION 1102 | PERSON X1 | POSE INFORMATION 1112 |
| CRO SUZUKI, OPERATOR | PERSON Y | - | PERSON Y1 | POSE INFORMATION 1113 |

INFORMATION PROCESSING DEVICE, INFORMATION PROCESSING METHOD, AND STORAGE MEDIUM

This application is a National Stage Entry of PCT/JP2021/045988 filed on Dec. 14, 2021, the contents of all of which are incorporated herein by reference, in their entirety.

TECHNICAL FIELD

The present invention relates to an information processing apparatus, an information processing method, and a program.

BACKGROUND ART

Recently, the action recognition technology to recognize human actions has been put into practical use, and the applications thereof in various fields has been increased. For example, the action recognition technology is utilized in various fields to reduce human workloads.

For example, in the field of nursing, an image processing apparatus has been proposed for inferring an action of a moving object in a detection area on the basis of the posture of the moving object (e.g., see Patent Literature 1).

Further, a technique has been proposed in which the relationship between a human and an object detected in rectangular shapes is expressed by an attention mechanism, and features necessary for action label prediction are extracted (e.g., see Non-patent Literature 1).

CITATION LIST

Patent Literature

Patent Literature 1

Japanese Patent Application Publication, Tokukai, No. 2021-65617

Non-Patent Literature

Non-patent Literature 1

Attend and Interact: Higher-Order Object Interactions for Video Understanding, Ma et. al., CVPR, 2018

SUMMARY OF INVENTION

Technical Problem

However, for example, the image processing apparatus disclosed in Patent Literature 1 infers the human action on the basis of only the information on a human without considering the environment other than the human. Therefore, there has been a problem in that it is difficult to accurately infer human actions on the basis of such a small amount of information. In the technique disclosed in Non-patent Literature 1, humans and objects are recognized as rectangular information without specifying what the objects are, using only image features without considering detailed location information. Therefore, there has been a problem in that human actions cannot be accurately recognized.

An example aspect of the present invention has been made in view of these problems, and the object thereof is to provide a technique for recognition processing that is robust against information loss.

Solution to Problem

An information processing apparatus in accordance with an example aspect of the present invention includes at least one processor, the at least one processor carrying out: an extraction process of extracting a plurality of pieces of instance information for each of at least one instance included in an input video; an aggregation process of aggregating the plurality of pieces of instance information for each instance; an integration process of integrating, by integration means, for each instance, the plurality of pieces of instance information aggregated by the aggregation process, to generate instance integrated information; and a recognition process of generating, by recognition means, a recognition result on at least one of the at least one instance with reference to the instance integrated information generated by the integration process.

An information processing method in accordance with an example aspect of the present invention includes: extracting a plurality of pieces of instance information for each of at least one instance included in an input video; aggregating the plurality of pieces of instance information for each instance; integrating, for each instance, the plurality of pieces of instance information aggregated, to generate instance integrated information; and generating a recognition result on at least one of the at least one instance with reference to the generated instance integrated information.

A non-transitory storage medium storing a program in accordance with an example aspect of the present invention causes a computer to carry out: an extraction process of extracting a plurality of pieces of instance information for each of at least one instance included in an input video; an aggregation process of aggregating the plurality of pieces of instance information for each instance; an integration process of integrating, for each instance, the plurality of pieces of instance information aggregated by the aggregation process, to generate instance integrated information; and a recognition process of generating a recognition result on at least one of the at least one instance with reference to the instance integrated information generated by the integration process.

Advantageous Effects of Invention

According to an example aspect of the present invention, it is possible to provide a technique for recognition processing that is robust against information loss.

EXAMPLE EMBODIMENTS

First Example Embodiment

The following description will discuss a first example embodiment of the present invention in detail with reference to the drawings. The present example embodiment is basic to example embodiments that will be described later.

<Configuration of Information Processing Apparatus 1>

Figure 1:
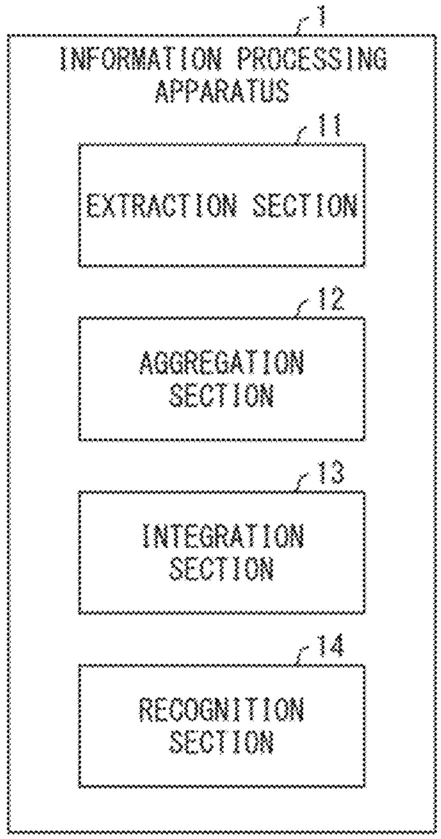
FIG. 1 is a block diagram illustrating an example configuration of an information processing apparatus in accordance with a first example embodiment of the present invention.

The following description will discuss the configuration of an information processing apparatus 1 in accordance with the present example embodiment with reference to FIG. 1. FIG. 1 is a block diagram illustrating the configuration of the information processing apparatus 1.

As illustrated in FIG. 1, the information processing apparatus 1 includes an extraction section 11, an aggregation section 12, an integration section 13, and a recognition section 14. The extraction section 11 has a configuration for implementing extraction means in the present example embodiment. The aggregation section 12 has a configuration for implementing aggregation means in the present example embodiment. The integration section 13 has a configuration for implementing integration means in the present example embodiment. The recognition section 14 has a configuration for implementing recognition means in the present example embodiment.

The extraction section 11 extracts a plurality of pieces of instance information for each of at least one instance included in an input video.

Here, the at least one instance refers to a target included in the video, which may be, for example, a human or a nonhuman object.

Each of the plurality of pieces of instance information may be information represented by, for example, a character string and/or a digit string. Information on an instance may be, for example, information necessary for specifying the instance, and may be information characterizing the instance.

The extraction section 11 may extract a plurality of pieces of instance information for each of at least one instance included in each frame of the plurality of image frames included in the input video.

Further, the extraction section 11 may be provided with a tracking function, and may use an existing tracking engine. In this case, the extraction section 11 may extract, in an integrated manner, a plurality of pieces of instance information from two or more frames of the plurality of image frames included in the input video.

The aggregation section 12 aggregates the plurality of pieces of instance information for each instance.

For example, "aggregating for each instance" refers to associating an instance with a piece of instance information that is based on the instance. Herein, the term "aggregation" refers to associating an instance with a plurality of pieces of instance information in a case where more than one pieces of instance information exist for a given single instance. In other words, the term "aggregation" is to generate data obtained by associating pieces of instance information for each instance.

The integration section 13 integrates, for each instance, the plurality of pieces of instance information aggregated by the aggregation section 12, to generate instance integrated information.

For example, the instance integrated information may be generated by concatenating and/or adding, for each instance, pieces of instance information aggregated by the aggregation means. The term "concatenating" may be, for example, to arrange two or more pieces of data having the same dimensionality or different dimensionalities into one piece of data having a dimensionality greater than that of the pieces of data before concatenating. For example, the term addition may mean that two or more pieces of data having the same dimensionality are summed up into one data without changing the dimensionality.

The recognition section 14 generates a recognition result on at least one of the at least one instance with reference to the instance integrated information generated by the integration section 13.

For example, the recognition result may be generated for each instance with reference to instance integrated information of the instance. For example, the recognition result may be: text data composed of words, sentences; graph data; or image data.

<Example Advantage of Information Processing Apparatus 1>

As described in the foregoing, the information processing apparatus 1 in accordance with the present example embodiment employs a configuration of generating a recognition result on an instance or instances by using the plurality of pieces of instance information, for each of the at least one instance. Therefore, according to the information processing apparatus 1 in accordance with the present example embodiment, it is possible to provide a technique for recognition processing that is robust against information loss, in recognition processing for recognizing information on a target such as a human and an object, and an event associated with a human and an object. It is possible to achieve an example advantage of recognizing an action of an instance more accurately.

<Flow of Information Processing Method Carried Out by Information Processing Apparatus 1>

Figure 2:
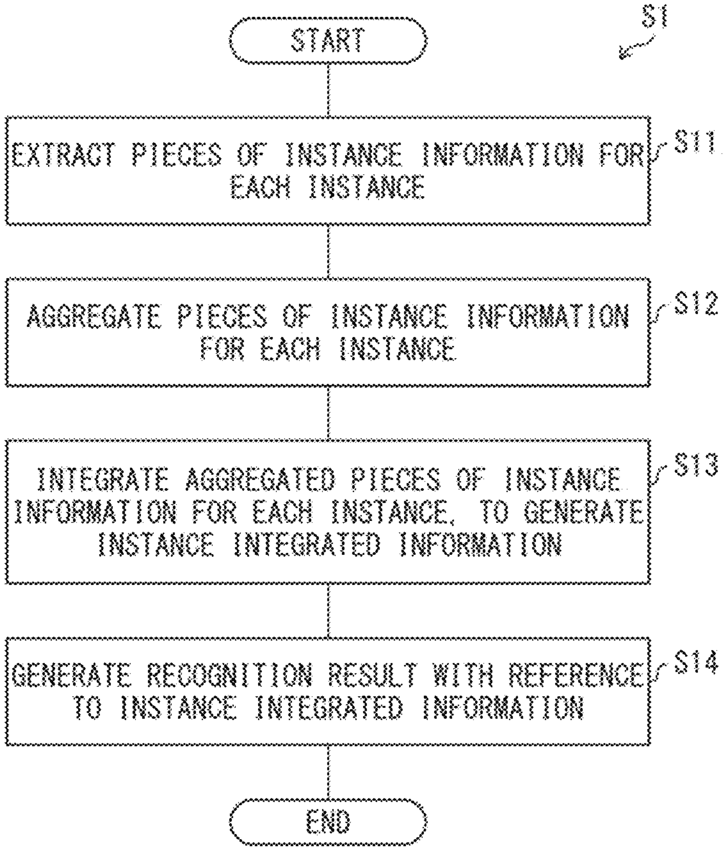
FIG. 2 is a flowchart illustrating the flow of an information processing method in accordance with the first example embodiment of the present invention.

The following description will discuss the flow of an information processing method carried out by the information processing apparatus 1 in accordance with the present example embodiment, with reference to FIG. 2. FIG. 2 is a flowchart illustrating the flow of the information processing method. As illustrated in FIG. 2, the information processing includes steps S11 to S14.

(Step S11)

In step S11, the extraction section 11 extracts a plurality of pieces of instance information for each of at least one instance included in an input video.

(Step S12)

In step 12, the aggregation section 12 aggregates the plurality of pieces of instance information for each instance.

(Step S13)

In step 13, the integration section 13 integrates, for each instance, the aggregated pieces of instance information, to generate instance integrated information.

(Step S14)

In step 14, the recognition section 14 generates a recognition result on at least one of the at least one instance with reference to the generated instance integrated information.

<Example Advantage of Information Processing Method>

The information processing method in accordance with the present example embodiment employs a configuration of generating a recognition result on an instance or instances by using the plurality of pieces of instance information, for each of the at least one instance. Therefore, according to the information processing method in accordance with the present example embodiment, it is possible to provide a technique for recognition processing that is robust against information loss, in recognition processing for recognizing information on a target such as a human and an object.

Second Example Embodiment

The following description will discuss a second example embodiment of the present invention in detail with reference to the drawings. The same reference symbols are given to constituent elements which have functions identical to those described in the first example embodiment, and descriptions as to such constituent elements are omitted as appropriate.

<Configuration of Information Processing Apparatus 1A>

Figure 3:
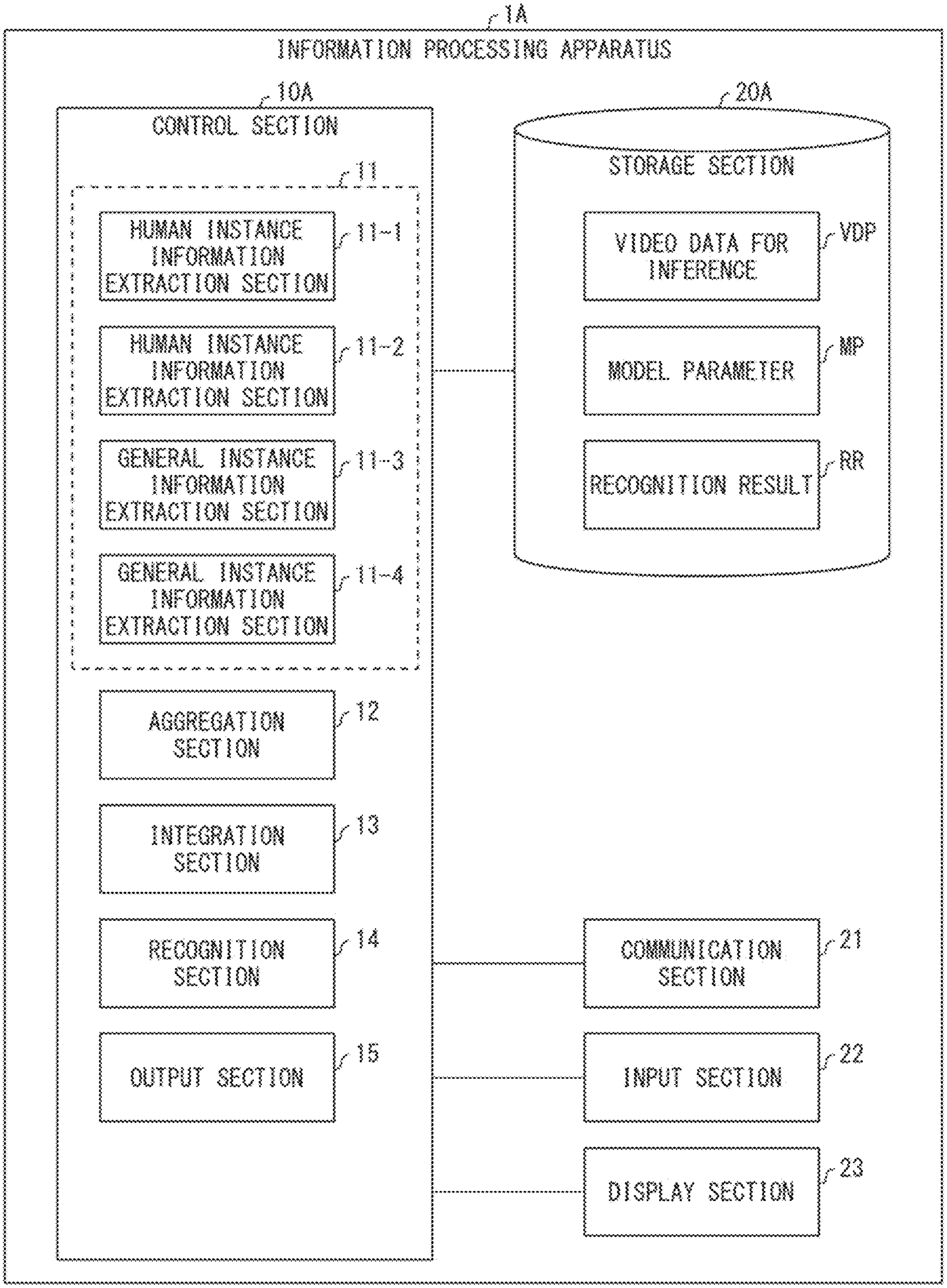
FIG. 3 is a block diagram illustrating an example configuration of an information processing apparatus in accordance with a second example embodiment of the present invention.

The following description will discuss the configuration of an information processing apparatus 1A in accordance with the present example embodiment with reference to FIG. 3. FIG. 3 is a block diagram illustrating an example configuration of the information processing apparatus 1A. As illustrated in FIG. 3, the information processing apparatus 1A includes a storage section 20A, a communication section 21, an input section 22, a display section 23, and a control section 10A.

The storage section 20A is constituted by, for example, a semiconductor memory device and stores data. In this example, the storage section 20A stores video data for inference VDP, a model parameter MP, and a recognition result RR. Here, the model parameter is a weighting factor obtained by machine learning described later. The model parameter MP includes a model parameter for use in an integration process of the integration section 13, and a model parameter for use in a recognition process of the recognition section 14.

The communication section 21 is an interface for connecting the information processing apparatus 1A to a network. A specific configuration of the network is not intended to limit the present example embodiment, and examples of the network may include a wireless local area network (LAN), a wired LAN, a wide area network (WAN), a public network, a mobile data communication network, and a combination of these networks.

The input section 22 receives various inputs to the information processing apparatus 1A. A specific configuration of the input section 22 is not intended to limit the present example embodiment, and, as an example, the input section 22 may be configured to include an input device such as a keyboard and a touchpad. In addition, the input section 22 may be configured to include, for example, a data scanner for reading data via electromagnetic waves such as infrared rays and radio waves, and a sensor for sensing the state of the environment.

The display section 23 displays a recognition result outputted from the control section 10A. The display section 23 may be implemented by, for example, a display device such as a liquid crystal display device or an organic electroluminescence (EL) display device, capable of displaying in black and white or in color.

The control section 10A has functions similar to those of the information processing apparatus 1 described in the first example embodiment. The control section 10A includes an extraction section 11, an aggregation section 12, an integration section 13, a recognition section 14, and an output section 15.

The extraction section 11 extracts a plurality of pieces of instance information for each of at least one instance included in an input video. The extraction section 11 may be provided with a human instance information extraction section that extracts instance information associated with a human. FIG. 3 illustrates an example configuration in which two human instance information extraction sections (a human instance information extraction section 11-1 and a human instance information extraction section 11-2) are provided, but the present invention is not limited thereto. The extraction section 11 may include three or more human instance information extraction sections. Each human instance information extraction section may extract a single type of instance information.

For example, such human-associated instance information may include: rectangular information that is a rectangle surrounding a human; pose information that represents the posture of a human; and segmentation information that indicates the surrounding environment of a human. Further, in a case where a plurality of pieces of rectangular information are extracted from one image frame of the target video data, identification information for identifying each piece of rectangular information may be added to each human instance as instance information.

Specifically, the rectangular information may include the position of the rectangular area and the size of the rectangular area in the image. The position of the rectangular area and the size of the rectangular area in the image may be expressed by an x-coordinate value or a y-coordinate value of the image element (pixels) in the image, or a value obtained by normalizing an x-coordinate and a y-coordinate by the image size.

Specifically, the pose information may include information on the human skeletal frame and joints. For example, the pose information may be one in which characteristic points of the human skeletal frame and joints are represented by x-coordinate values and y-coordinate values of image elements in the image. The pose information may also include a circumscribing rectangle surrounding the characteristic points of the skeletal frame and joints.

For example, the segmentation information may be a human area included in the rectangular information, information on a nonhuman part included in the rectangular information, and information on a nonhuman part included in the circumscribing rectangle, which is the pose information.

The plurality of pieces of instance information may be extracted with different engines depending on the type of the pieces of instance information, and may be extracted with the same engine.

In a case where the extraction section 11 includes the tracking function, a result of tracking at least one of a rectangle, a pose, and a segmentation in a plurality of image frames included in the video may be extracted as rectangular information, pose information, and segmentation information, respectively. Further, action information indicating a human action that is detected on the basis of one or both of the rectangular information and the pose information in the plurality of image frames may be extracted as the human instance information. The action information may be extracted with further reference to the segmentation information.

Further, the extraction section 11 may include general instance information extraction that extracts general instance information associated with a nonhuman instance. The nonhuman instance may be an object. FIG. 3 illustrates an example configuration in which two general instance information extraction sections (a general instance information extraction section 11-3 and a general instance information extraction section 11-4) are provided, but the present invention is not limited thereto. The extraction section 11 may include three or more general instance information extraction sections. Each general instance information extraction section may extract a single type of instance information.

For example, the general instance information may include: rectangular information that is a rectangle surrounding an object; feature information that constitutes an object; and segmentation information that indicates the surrounding environment of an object. The feature information that constitutes an object may be, for example, a point, a line, or the like indicating an edge of the object. Further, in a case where a plurality of pieces of rectangular information are extracted from one image frame of the target video data, identification information for identifying each piece of rectangular information may be added to each general instance as general instance information.

Figure 4:
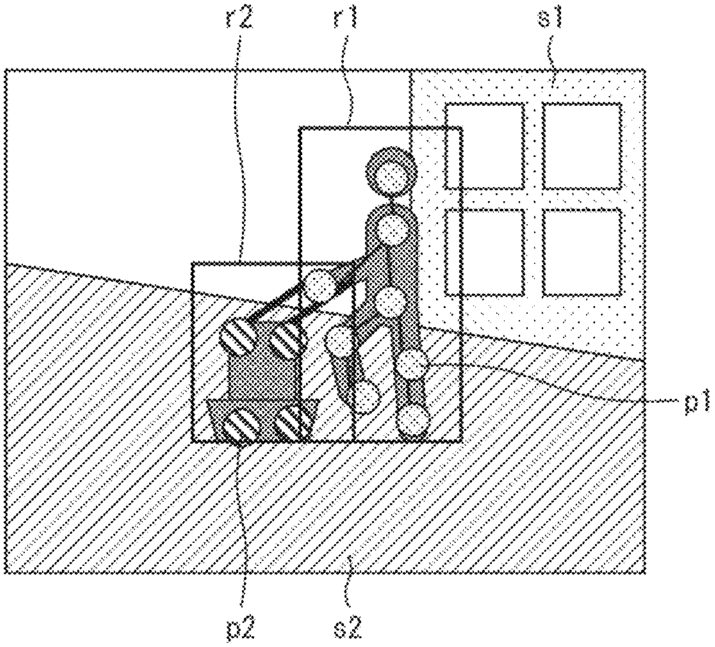
FIG. 4 is a diagram for describing an example of an extraction process carried out by an extraction section in accordance with the second example embodiment of the present invention.

FIG. 4 is a schematic diagram for describing an example of an extraction process. FIG. 4 illustrates, as an example, an image obtained by shooting a state at a construction site, and the image includes a person and a compactor operated by the person. The image also includes a building and the ground around the person and the compactor. Here, as the human instance information, rectangular information r1 and pose information p1 are extracted, and as the general instance information, rectangular information r2 and pose information p2 are extracted. The building and the ground are extracted as segmentation information s1 and segmentation information s2, respectively.

The aggregation section 12 aggregates the plurality of pieces of instance information for each instance. Here, the term "aggregation" refers to associating pieces of instance information with an instance. Specifically, the aggregation section 12 associates, with one instance, different kinds of pieces of instance information such as the rectangular information, the pose information, the action information, and the segmentation information, described above. The aggregation section 12 may aggregate, for one instance, pieces of instance information extracted from each of a plurality of image frames at different shooting times.

For example, the aggregation section 12 may aggregate, for each instance, a plurality of pieces of rectangular information, a plurality of pieces of pose information, a plurality of pieces of segmentation information, and the like, extracted from a plurality of image frames at different shooting times, as the pieces of instance information.

For example, the aggregation section 12 may aggregate, to a single instance, a plurality of pieces of rectangular information (instance information) extracted from each of a plurality of image frames at different shooting times, with reference to the sizes, the positions, or the like of rectangles included in the rectangular information.

Further, for example, the aggregation section 12 may aggregate, to a single instance, a plurality of pieces of pose information (instance information) extracted from each of a plurality of image frames at different shooting times, with reference to the positions of skeletal frames and the positions of joints included in the pose information.

Further, there may be a case where the segmentation information indicating the surrounding environment does not change significantly even among a plurality of image frames at different shooting times. Therefore, when aggregating the plurality of pieces of instance information to an instance, the aggregation section 12 may refer to the relationship between the position in the image of the segmentation included in the segmentation information, and the position of a rectangle included in the rectangular information and the position of a skeletal frame included in the pose information. As an example, the aggregation section 12 may determine the distance between the segmentation, and the rectangle and the skeletal frame, and aggregate, to a single instance, the pieces of instance information including the rectangle and the skeletal frame having a distance within a predetermined range in a plurality of image frames at different shooting times.

Figure 5:
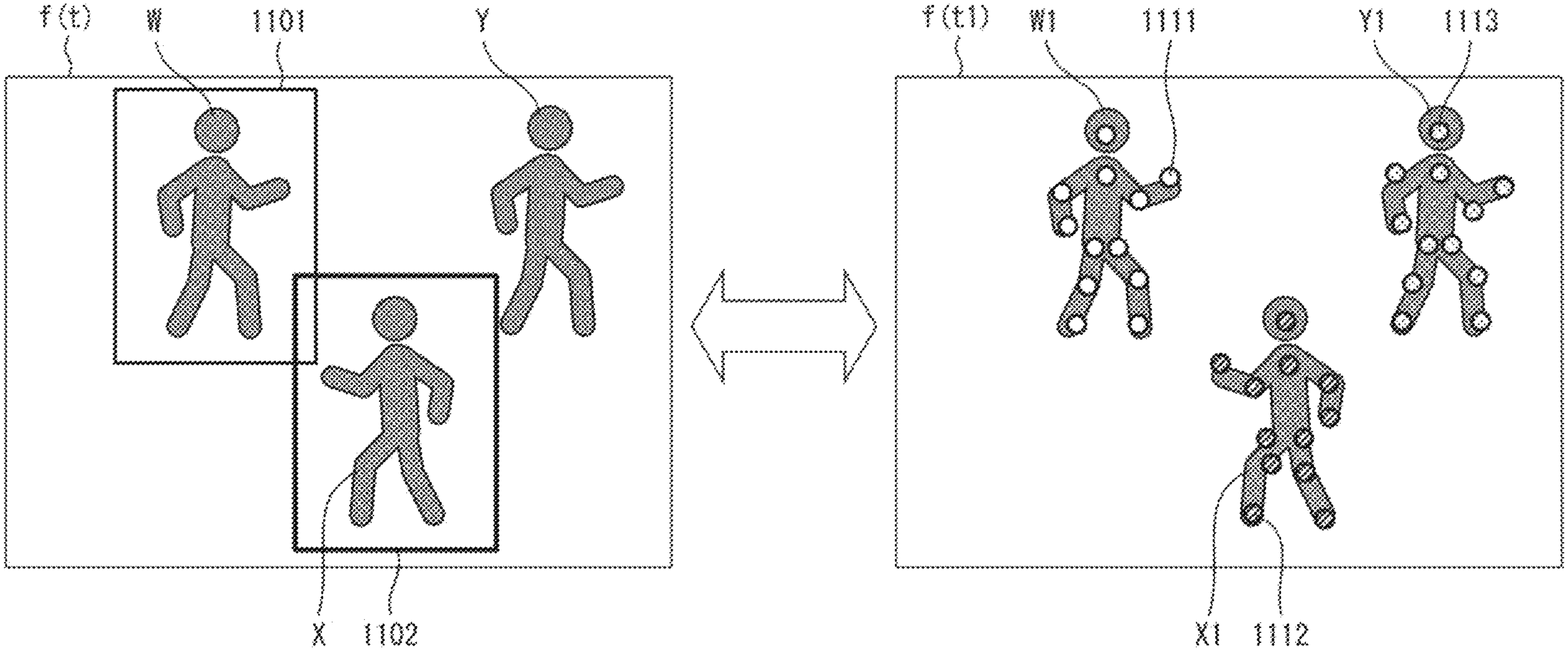
FIG. 5 is a diagram for describing an example of an aggregation process carried out by an aggregation section in accordance with the second example embodiment of the present invention.

The following description will discuss a specific example of an aggregation process carried out by the aggregation section 12. FIG. 5 is a diagram for describing an example of the aggregation process carried out by the aggregation section 12. FIG. 5 illustrates a frame f(t) and a frame f(t1), which are each an image frame at the same shooting time t. As an example, the extraction section 11, which may be specifically the human instance information extraction section, extracts person W as rectangular information 1101 and person X as rectangular information 1102. As an example, the extraction section 11, which may be specifically the human instance information extraction section 11-2 extracts person W1 as pose information 1111, person X1 as pose information 1112, and person Y1 as pose information 1113.

In addition, the aggregation section 12 may output data representing a result in which an instance and a piece of instance information are associated with each other. Data D1 of FIG. 5 shows an example of a data structure illustrating a result of the aggregation process carried out by the aggregation section 12. In the case of FIG. 5, for example, the aggregation section 12 may identify that the person W and the person W1 are the same instance on the basis of the position of the rectangular information and the position of the pose information, and aggregate the pieces of instance information. That is, the aggregation section 12 may associate the rectangular information 1101 and the pose information 1111 with a single instance. Specifically, the aggregation section 12 may identify that one having a greater degree of overlap between the rectangle of the rectangular information and the circumscribing rectangle of the pose information is a single instance. Further, for example, although no rectangular information of person Y has been extracted, this person Y and the person Y1 may be identified as the same instance in an elimination method, and the pieces of instance information may be aggregated. That is, the aggregation section 12 may associate pose information 1113 with the person Y and the person Y1, which are the same instance.

Between the image frames at different shooting times, the aggregation section 12 may aggregate the pieces of instance information with reference to the locus of each piece of instance information between the frames. Specifically, the aggregation section 12 may compare the loci of different instances between frames, and associate the loci having greater degrees of overlap with a single instance.

Figure 6:
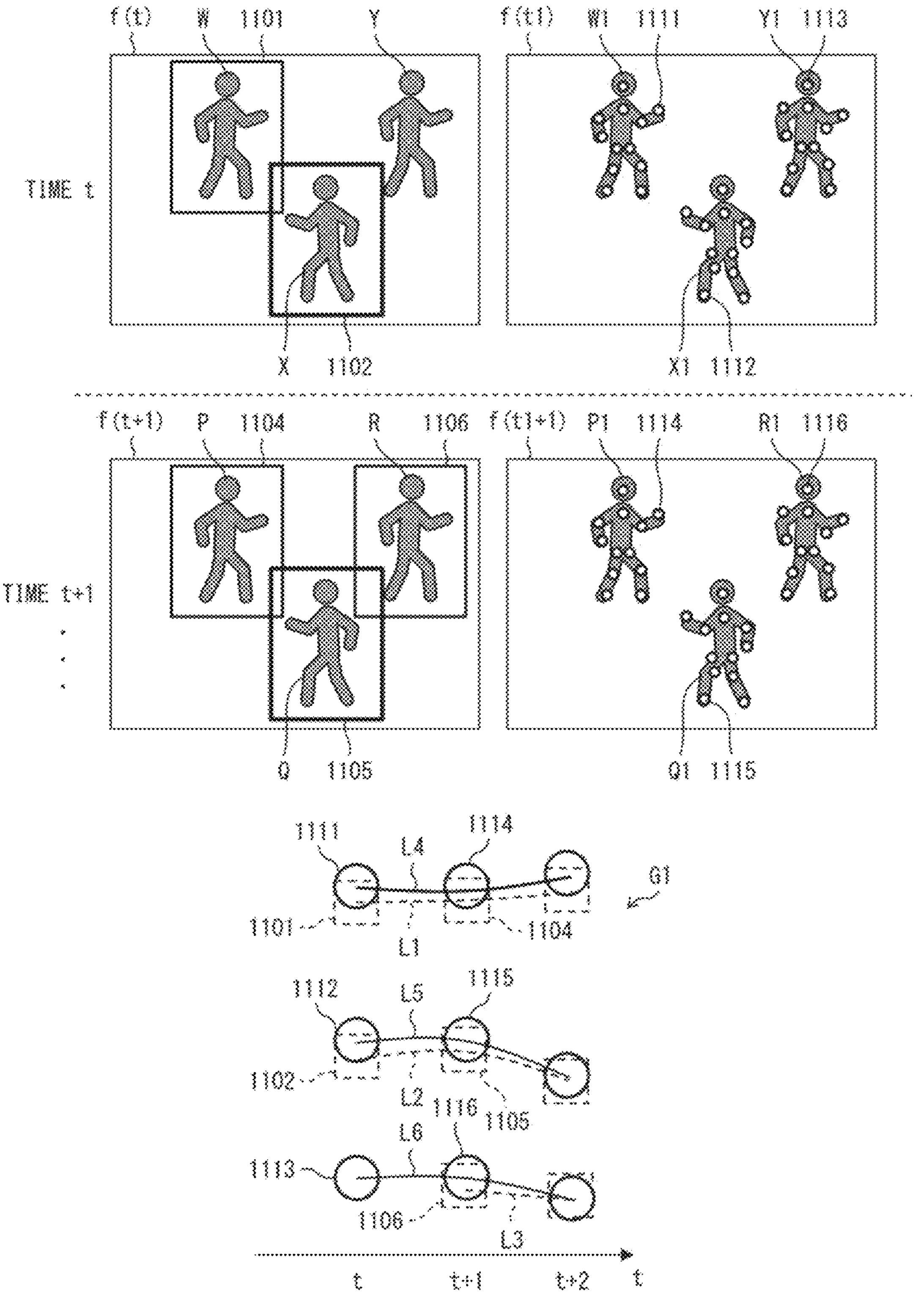
FIG. 6 is a diagram for describing an example of the aggregation process carried out by the aggregation section in accordance with the second example embodiment of the present invention.

FIG. 6 is a diagram for describing an example of the aggregation process carried out by the aggregation section 12. FIG. 6 illustrates a frame f(t) and a frame f(t1) each of which is an image frame at shooting time t, and a frame f(t+1) and a frame f(t1+1), each of which is an image frame obtained at shooting time t+1. The frame f(t) and the frame f(t1) of FIG. 6 is identical to the frame f(t) and the frame f(t1) described with reference to FIG. 5.

As an example, in the frame f(t1+1), the extraction section 11 may extract person P as rectangular information 1104, person Q as rectangular information 1105, and person R as rectangular information 1106.

Further, as an example, in the frame f(t1+1), the extraction section 11 may extract person P1 as pose information 1114, person Q1 as pose information 1115, and person R1 as pose information 1116.

In FIG. 6, the aggregation section 12 may obtain the locus of the rectangle for each instance on the basis of the rectangular information included in the frame f(t) and the rectangular information included in the frame f(t+1), using, for example, values obtained from x-coordinate values and y-coordinate values of each rectangular pixel.

Further, the aggregation section 12 may obtain the locus of the pose for each instance on the basis of the pose information included in the frame f(t) and the pose information included in the frame f(t+1), using, for example, values each obtained from the x-coordinate value and the y-coordinate value of a pixel of each joint point or the circumscribing rectangle of each joint point.

In FIG. 6, graph G1 is a graph illustrating the loci of the rectangles and the poses. For example, locus L4 is a locus obtained from positions of the rectangles included in the rectangular information 1101, the rectangular information 1104, and rectangular information (not illustrated) of a frame at time t+2. Further, locus L1 is a locus obtained from positions of the poses included in the pose information 1111, the pose information 1114, and pose information (not illustrated) of a frame at time t+2. The aggregation section 12 may use a locus obtained from among a plurality of frames at different shooting times as one piece of instance information.

The aggregation section 12 may associate rectangular information and pose information with a single instance, in accordance with the degree of similarity of the shape of the locus of the rectangle and that of the locus of the pose. For example, the loci L1 and L4 may be aggregated as instance information belonging to the same instance. As described in the foregoing, the aggregation section 12 can aggregate the pieces of instance information by utilizing the loci obtained from the instance information of the plurality of frames in the aggregation process, even in a case where, for example, information loss such that no rectangular information is extracted in the frame f(t) has occurred.

The aggregation section 12 may add attribute information to each of the plurality of pieces of instance information. The attribute information is information representing an attribute of an instance, and may include, for example, a person's name, an object's name, a model number, and the like. The attribute information only needs to be one based on which an instance can be identified, and may be a predetermined management number or the like. In addition, when there are multiple instances of the identical type, a numeral may be added after each object's name, and different attribute information may be added so that instances of the identical type can be identified.

The integration section 13 integrates, for each instance, the plurality of pieces of instance information aggregated by the aggregation section 12, to generate instance integrated information. The integration section 13 includes: at least one conversion layer 130 that applies a conversion process to each piece of instance information; and at least one integration layer 131 that integrates the pieces of instance information which have been subjected to the conversion process. Each conversion layer 130 may include, for example, a multilayer perceptron, and may include two or more types of multilayer perceptron. For example, different types of multilayer perceptron may be applied depending on the type of instance information to be inputted.

Figure 7:
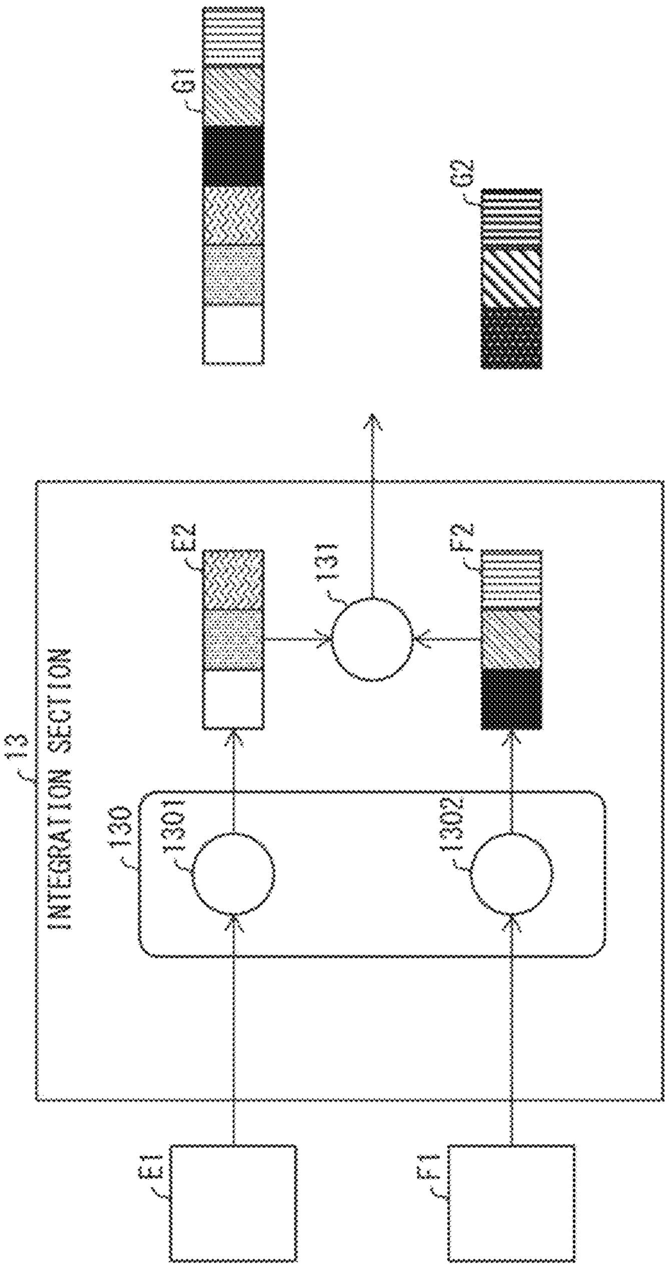
FIG. 7 is a diagram for describing an example of an integration process carried out by an integration section in accordance with the second example embodiment of the present invention.

FIG. 7 is a diagram in which an integration process carried out by the integration section 13 is modeled. The model illustrated in FIG. 7 includes the conversion layer 130 and the integration layer 131. As an example, in FIG. 7, the conversion layer 130 includes a first conversion layer 1301 into which instance information E1 is inputted, and a second conversion layer 1302 into which instance information F1 is inputted. Here, the first conversion layer 1301 and the second conversion layer 1302 may be different multilayer perceptrons. Further, the pieces of instance information which have been subjected to the conversion process in the conversion layer 130 are integrated in the integration layer 131 and outputted as one instance information G1 (instance integrated information to be described later). Specifically, each piece of instance information loaded into a one-dimensional tensor may be inputted into the conversion layer 130, and, in the conversion layer, tensors may be transformed into the same dimensionality between each piece of information.

As also described in the first example embodiment, the integration layer 131 may integrate the pieces of instance information, such as combining two pieces of instance information, or adding two pieces of instance information. As the instance information G1 illustrated in FIG. 7, concatenated instance information is a piece of data that is obtained by arranging two or more pieces of data each having the same dimensionality, and that has a greater dimensionality than those of the pieces of date before concatenation. As instance information G2 illustrated in FIG. 7, the added instance information is a piece of data obtained by adding two or more pieces of data having the same dimensionality without changing the dimensionality.

The integration section 13 adds a significance to each piece of instance information which has been subjected to the conversion process by the at least one conversion layer 130, and the at least one integration layer 131 integrates the pieces of instance information by means of the significance.

The significance may be a weight by which the instance information is multiplied. That is, the integration section 13 may carry out weighting on the instance information which has been subjected to the conversion process, and the weighted instance information may be integrated.

Figure 8:
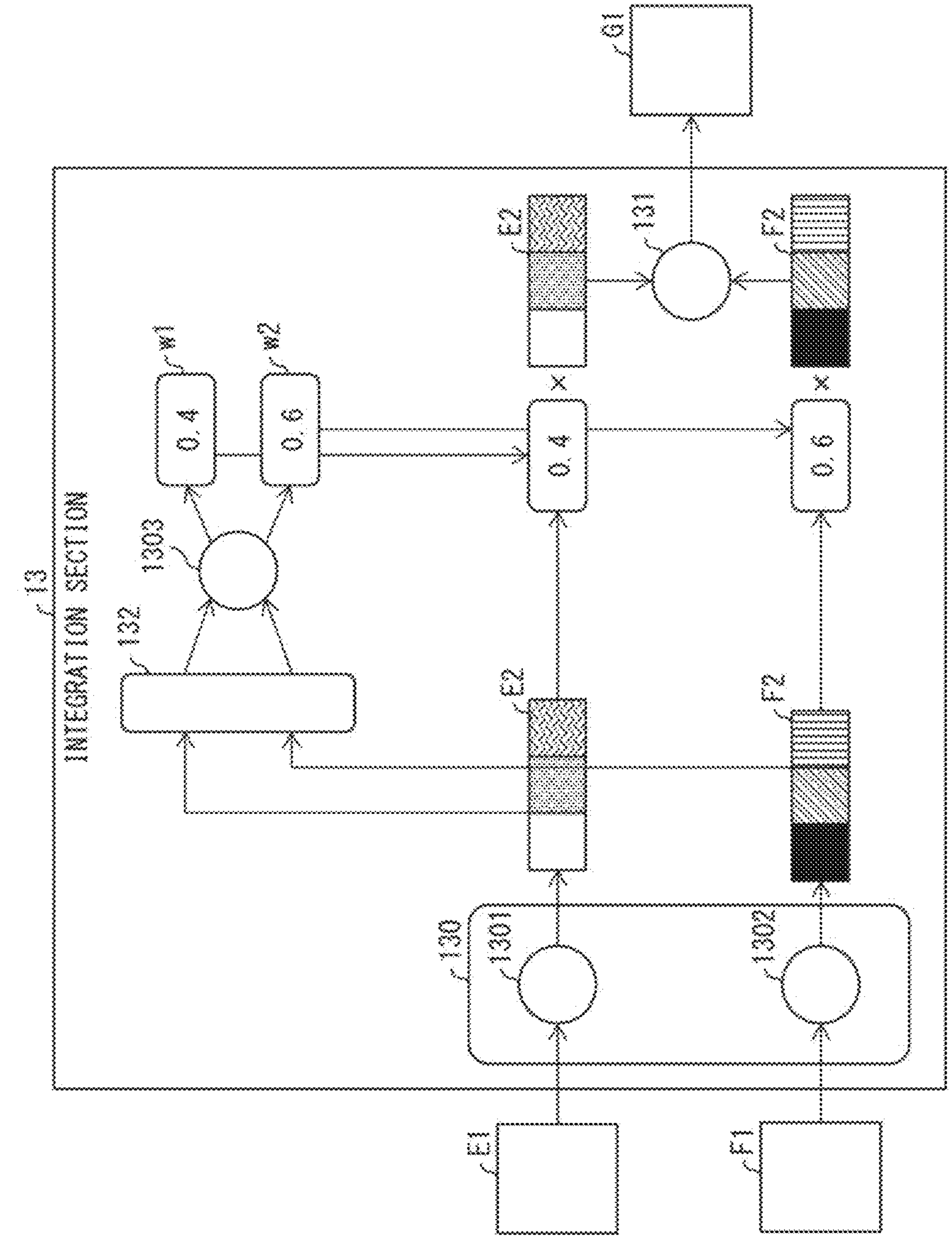
FIG. 8 is a diagram for describing an example of the integration process carried out by the integration section in accordance with the second example embodiment of the present invention.

FIG. 8 is a diagram in which the integration process carried out by the integration section 13 is modeled. Similarly to the integration section 13 illustrated in FIG. 7, the integration section 13 illustrated in FIG. 8 includes the conversion layer 130 and the integration layer 131; however, the integration section 13 illustrated in FIG. 8 differs in that a significance is added to each piece of instance information which has been subjected to the conversion process, and the pieces of instance information are integrated by means of the significance. The integration section 13 may include a pooling layer 132.

In FIG. 8, for example, each of instance information E2 and instance information F2 which have been subjected to the conversion process is inputted into the pooling layer 132, in which global average pooling may be applied, for example. Then, it is inputted into the conversion layer 130, and the significance w1 of the instance information E2 and the significance w2 of the instance information F2 are outputted as numerical values. The significance may be outputted by applying a sigmoid function to information which has been subjected to the conversion process by the conversion layer 130. The significance may be a numeric value of from 0 up to 1. As an example, in FIG. 8, the significance w1 is outputted as 0.4 and the significance w2 is outputted as 0.6. By multiplying, with the output significances w1 and w2, the respective instance information E2 and the instance information F2 which have been subjected to the conversion process by the conversion layer 130, each significance is added to the corresponding instance information. Such pieces of the instance information to which the respective significances are added are integrated by the integration layer 131 and outputted as the instance information G1.

The integration section 13 may include as the at least one conversion layer, a plurality of conversion layers being arranged in series and each applying a conversion process to each piece of instance information; and the at least one integration layer may include at least one integration layer that adds a significance to each piece of instance information which has been subjected to the conversion process by the conversion layers, and integrates the pieces of instance information by means of the significance.

Although FIG. 8 illustrates an example aspect in which the integration section 13 includes one conversion layer 130, the integration section 13 may include two or more conversion layers. As the number of times the conversion process is carried out increases, the gap between pieces of information the plurality of pieces of instance information have decreases. That is, as the number of conversion layers to receive input increases, the inter-information similarity increases. In some cases, it may be preferable, in the integration layer 131, to add the pieces of instance information that have a smaller inter-information gap. In contrast, it may be preferable, in the integration layer 131, to concatenate the pieces of instance information having a greater inter-information gap, that is, the less inter-information similarity. Thus, the integration layer 131 may determine whether to concatenate or add the pieces of instance information which have been subjected to the conversion process, depending on the number of conversion layers.

In addition, when the integration section 13 includes multiple conversion layers, the integration section 13 may further include an attention block. As an example, the attention block calculates, from the input instance information, a weighting factor as an index for indicating whether or not to pay attention to the instance information.

The weighting factor may, for example, be one that represents the similarity of input pieces of instance information. The weighting factor may be set to an actual number of from 0 up to 1. The weighting factor may, for example, be set depending on the recognition accuracy at the time when the input pieces of instance information are integrated. Specifically, the weighting factor may be set to a value close to 1 when integration of the input pieces of instance information leads the recognition accuracy to increase, whereas the weighting factor may be set to a value close to 0 when the integration leads the recognition accuracy to decrease. That is, the weighting factor may be set to a value closer to 1 as the recognition accuracy is higher, and a value closer to 0 as the recognition accuracy is lower.

Depending on the similarity between pieces of information, whether integrating in a shallow layer or in a deep layer is preferable is varied. Thus, use of the attention block allows the integration process to be appropriately carried out depending on the similarity between pieces of instance information.

Figure 9:
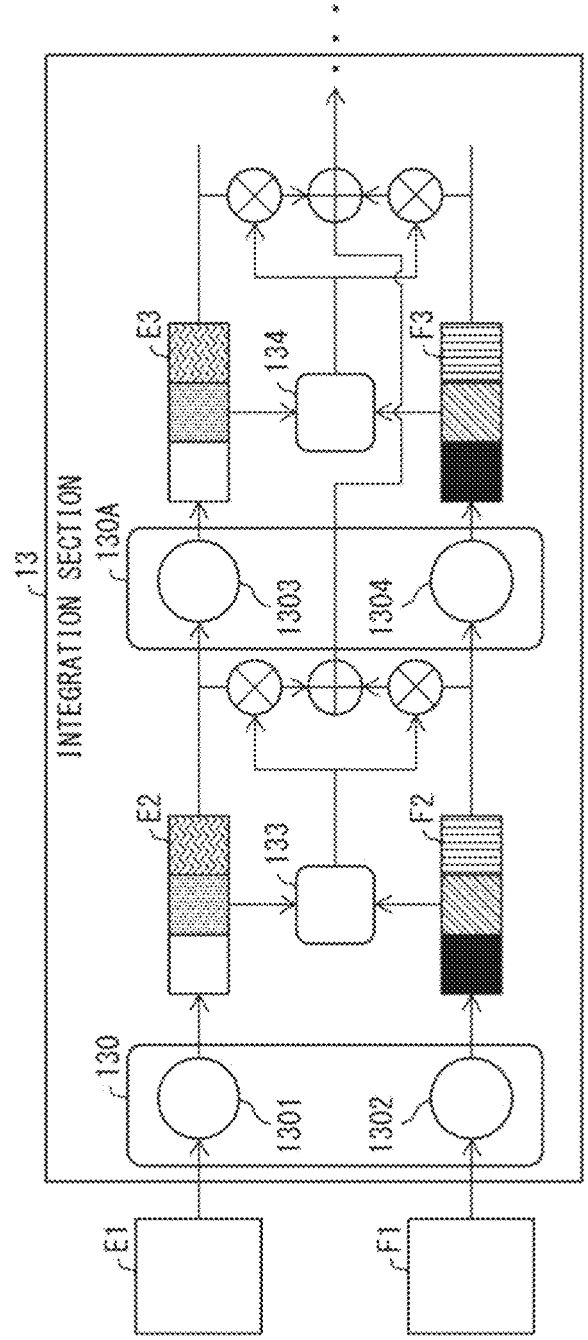
FIG. 9 is a diagram for describing an example of the integration process carried out by the integration section in accordance with the second example embodiment of the present invention.

FIG. 9 is a diagram in which the integration process carried out by the integration section 13 is modeled. As an example, the integration section 13 includes multiple conversion layers 130, 130A and attention blocks 133, 134. The instance information E1 and the instance information F1 inputted into the integration section 13 are subjected to the conversion process by the first conversion layer 1301 and the second conversion layer 1302, respectively, of the conversion layer 130, and the instance information E2 after the conversion process and the instance information F2 after the conversion process are outputted. Here, the instance information E2 and the instance information F2 after the conversion process are inputted into the attention block 133, in which a weighting factor based on the similarity between the instance information E2 and the instance information F2 is added.

It should be noted that the instance information to which the weighting factor is added in the attention block 133 may be inputted into the integration layer (not illustrated) without being inputted into the subsequent conversion layer (e.g., conversion layer 130A) in accordance with the weighting factor. Further, the instance information E3 and the instance information F3 after the conversion process which has been subjected to the conversion process carried out in the conversion layer 130A are inputted into the attention block 134, and then, similarly to the attention block 133, may be added with a weighting factor based on the similarity between the instance information E2 and the instance information F2. That is, by providing the integration section 13 with the attention block 133, it may be automatically selected which of the conversion processes of which of the multiple conversion layers is followed by the instance information integration, in the multiple conversion layers.

The number of the attention blocks included in the integration section 13 is not limited. The number of the attention blocks included in the integration section 13 may be the same as that of conversion layers in the thickness direction.

The recognition section 14 generates a recognition result on an action of a human among the at least one instance. The recognition section 14 generates a recognition result on a human action with reference to integrated information generated by the integration section 13. The recognition section 14 carries out a recognition process by using the model parameter MP stored in the storage section 20A. The recognition section 14 may use an existing action recognition engine. The recognition section 14 may generate a recognition result on a human action by using both human-associated instance integrated information and object-associated instance integrated information.

For example, with reference to the integrated information, the recognition section 14 may generate, as a recognition result, information in which a score is added to each action inferred to be carried out by each instance (human). As an example, as a recognition result, the recognition section 14 may generate information in which a probability is added to a predetermined action, as the operation performed by operator A, such as "(1) 70% probability of working on compaction of the ground with a compactor; (2) 20% probability of repairing the compactor; (3) 10% probability of carrying the compactor".

The recognition section 14 applies different identification processes to human-associated instance integrated information and object-associated instance integrated information, among the at least one instance. The recognition section 14 may use different model parameters for human-associated instance integrated information and object-associated instance integrated information, or alternatively, may use different action recognition engines.

The output section 15 outputs the recognition result generated by the recognition section 14. The output section 15 may output the recognition result as it is as originally generated by the recognition section 14, and may output a part of the recognition result. For example, when the recognition section 14 generates, as the recognition result, information in which a score is added to each of the inferred multiple actions, the output section 15 may output only an action having the highest score.

For example, when the recognition section 14 generates the recognition result of "(1) 70% probability of working on compaction of the ground with a compactor; (2) 20% probability of repairing the compactor; (3) 10% probability of carrying the compactor" as the action of the operator A as described above, the output section 15 may output a recognition result of "operator A is working on compaction of the ground with a compactor".

Figure 10:
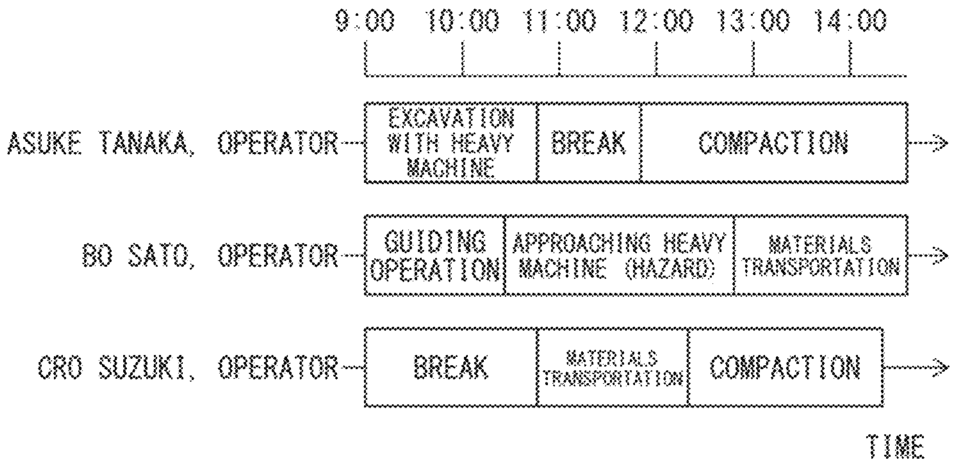
FIG. 10 is a diagram illustrating an example of a recognition result outputted by an output section in accordance with the second example embodiment of the present invention.

FIG. 10 is a diagram illustrating an example of the recognition result outputted by the output section 15. In FIG. 10, the recognition result is a table as an example. FIG. 10 illustrates, in a time series, actions of three people, which are each an instance. Further, in the recognition result in FIG. 10, each action of the three people indicates a relationship with an object. According to the recognition result illustrated in FIG. 10, for example, a manager who manages operators can accurately know the operation status of each operator.

<Example Advantage of Information Processing Apparatus 1A>

As described in the foregoing, the information processing apparatus 1A in accordance with the present example embodiment employs a configuration in which the conversion process is applied to each piece of instance information, and the pieces of instance information after the conversion process are integrated.

With this configuration, it is possible to apply the conversion process to each piece of instance information, and integrate the pieces of instance information after the conversion process. Therefore, in addition to the example advantage of the information processing apparatus 1 in accordance with the first example embodiment, it is possible to reduce loss of information in the conversion process and the integration process. Further, since the plurality of pieces of instance information are integrated, it is possible to improve the recognition accuracy of the recognition process even in a case where the information has been lost.

Further, the information processing apparatus 1A in accordance with the present example embodiment employs a configuration in which the significance is added to the pieces of instance information after the conversion process, and the pieces of the instance information are integrated by means of the significance.

With this configuration, for each piece of instance information, it is possible to add a significance in accordance with the instance information, and integrate the pieces of the instance information to which the significance is added, into one piece of information. Therefore, in addition to the example advantage of the information processing apparatus 1 in accordance with the first example embodiment, it is possible to reduce loss of information in the integration process. Further, since the plurality of pieces of instance information are integrated, it is possible to improve the recognition accuracy of the recognition process even in a case where the information has been lost.

Further, the information processing apparatus 1A in accordance with the present example embodiment employs a configuration in which a plurality of conversion layers each applying a conversion process to each piece of the instance information is included, the significance is added to each piece of instance information after the conversion process, and the pieces of instance information is integrated by means of the significance.

With this configuration, the conversion process is applied to each piece of the instance information multiple times in series. Further, with this configuration, it is possible to add the significance in accordance with the instance information after the conversion process, and integrate the pieces of the instance information to which the significance is added, into one piece of information. Therefore, in addition to the example advantage of the information processing apparatus 1 in accordance with the first example embodiment, it is possible to convert instance information appropriately and to reduce loss of information in the conversion process and the integration process. Further, since the plurality of pieces of instance information are integrated, it is possible to improve the recognition accuracy of the recognition process even in a case where the information has been lost.

The information processing apparatus 1A in accordance with the present example embodiment employs a configuration in which a recognition process is carried out in which a recognition result on an action of a human among the at least one instance is generated.

With this configuration, it is possible to generate a recognition result on a human action. Therefore, in addition to the example advantage of the information processing apparatus 1 in accordance with the first example embodiment, it is possible to carry out processing of action recognition mainly involving a human.

Further, the information processing apparatus 1A in accordance with the present example embodiment employs a configuration in which different identification processes are applied to human-associated instance integrated information and object-associated instance integrated information, among the at least one instance.

With this configuration, it is possible to apply identification processes in accordance with each of the human-associated instance integrated information and the object-associated instance integrated information. Therefore, in addition to the example advantage of the information processing apparatus 1 in accordance with the first example embodiment, it is possible to reduce both the cost of the identification process and the loss of information in the identification process.

Further, the information processing apparatus 1A in accordance with the present example embodiment employs a configuration in which attribute information is added to the at least one instance.

With this configuration, attribute information is added to each of the at least one instance. Therefore, in addition to the example advantage of the information processing apparatus 1 in accordance with the first example embodiment, it is possible to identify every instance even in a case where there are multiple similar instances, and it is also possible to improve the recognition accuracy of the recognition process.

Third Example Embodiment

The following description will discuss a third example embodiment of the present invention in detail with reference to drawings. Note that any constituent element that is identical in function to a constituent element described in the first example embodiment will be given the same reference symbol, and a description thereof will not be repeated.

<Configuration of Information Processing Apparatus 1B>

Figure 11:
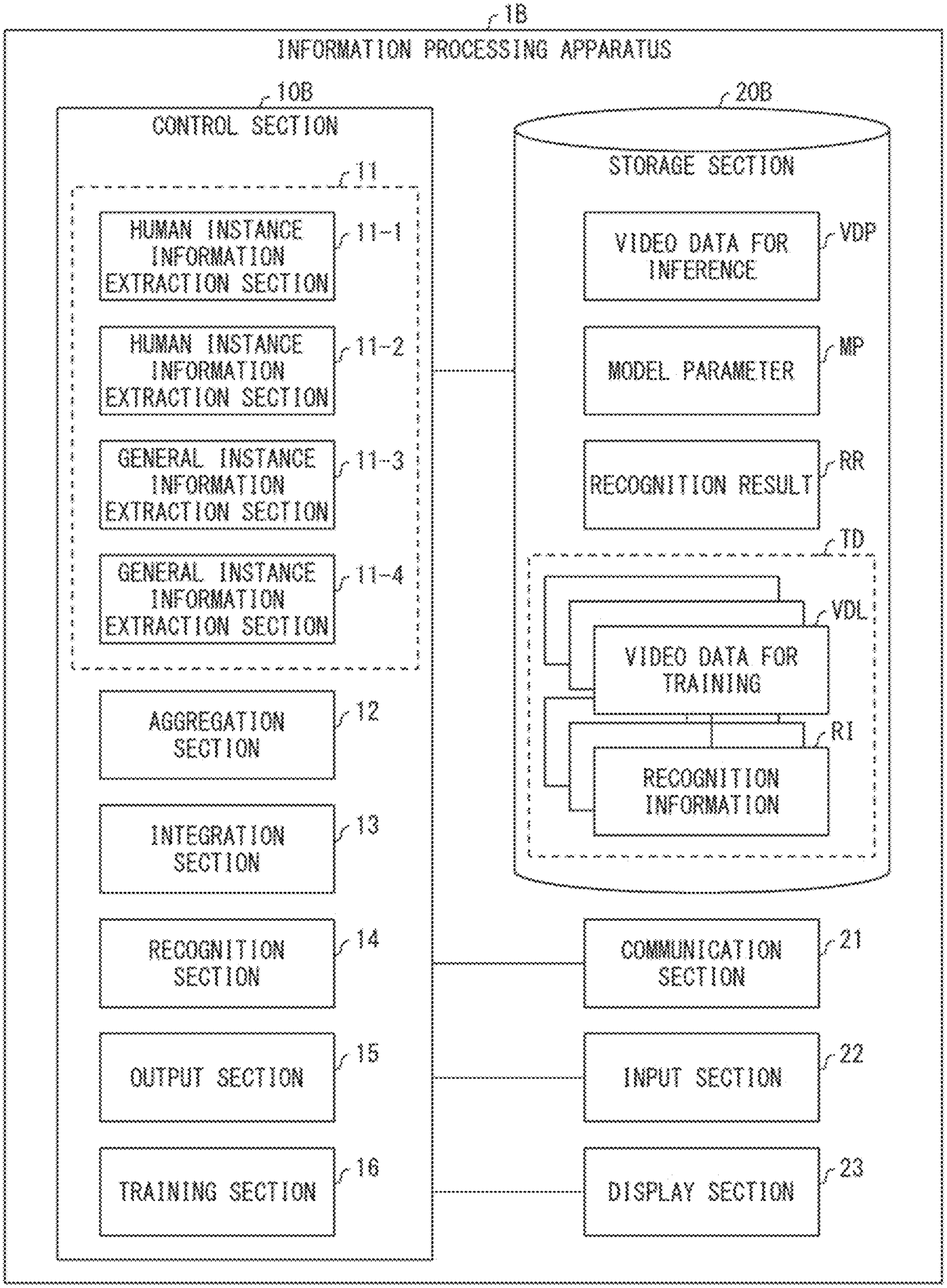
FIG. 11 is a block diagram illustrating an example configuration of an information processing apparatus in accordance with a third example embodiment of the present invention.

The following description will discuss the configuration of an information processing apparatus 1B in accordance with the present example embodiment with reference to FIG. 11. The information processing apparatus 1B is an apparatus that further includes a function for learning a model parameter of the storage section 20A in the information processing apparatus 1A.

FIG. 11 is a block diagram illustrating an example configuration of the information processing apparatus 1B. The information processing apparatus 1B illustrated in FIG. 11 is different from the information processing apparatus 1A illustrated in FIG. 3 in that a control section 10B is provided with a training section 16.

The training section 16 trains one or both of the integration section 13 and the recognition section 14, with reference to training data TD that includes a plurality of pairs of a video and recognition information RI associated with at least one of at least one instance included in the video.

The training data TD includes video data for training VDL. The video may be, for example, a video captured by a security camera.

The training data TD also includes recognition information RI. The recognition information RI may be a text, a graph, a table, or an image. The recognition information RI may be, for example, an action label of a person in a video given by an operator of the information processing apparatus 1B.

Similarly to the information processing apparatus 1A of the second example embodiment, the training section 16 may include functions of the extraction section 11, the aggregation section 12, the integration section 13, and the recognition section 14.

The training data TD may be generated, for example, in the following manner. A video of a security camera is obtained by the training section 16, and a plurality of instances related to each of at least one instance included in the video are extracted. Recognition information RI corresponding to the video is also obtained by the training section 16.

For example, an operator of the information processing apparatus 1B may determine, for each person in the obtained video, what action the person is doing and what kind of operation the person is doing, and add an action label. The operator of the information processing apparatus 1B may select a corresponding action label from among a plurality of action labels prepared in advance for human actions. Alternatively, the operator of the information processing apparatus 1B may further input the name of an object handled by the person. The operator of the information processing apparatus 1B adds, via the input section 22, an action label to each of the people in the obtained video.

Thereafter, another video is obtained by the training section 16, and the identical operation is carried out. By repeating such an operation, the training data TD including a plurality of pairs of the video and the recognition information RI associated with the instance included in the video is generated.

It should be noted that the abovementioned operation for generating the training data TD is merely an example, and is not intended to limit the present example embodiment. As used herein, the expression "training data" refers to data referred to in updating (training) a model parameter, and it is not intended to limit the scope. In place of the expression "training data" used in the present specification, other expressions such as "data for training" and "reference data" may be used.

After the training data having a sufficient number of pairs are generated, machine learning is carried out by the training section 16. That is, with reference to the training data, the training section 16 trains a prediction model representing a correlation between the video and the recognition information RI associated with the instance included in the video.

The training section 16 inputs the videos included in the training data TD into the extraction section 11, and updates one or both of a parameter of an integration model for use by the integration section 13 and a parameter of a recognition model for use by the recognition section 14 in such a manner as to reduce a difference between a recognition result generated by the recognition section 14 and the recognition information included in the training data.

The training section 16 may simultaneously update the parameter of the integration model and the parameter of the recognition model.

<Flow of Training Process Carried Out by Information Processing Apparatus 1B>

Figure 12:
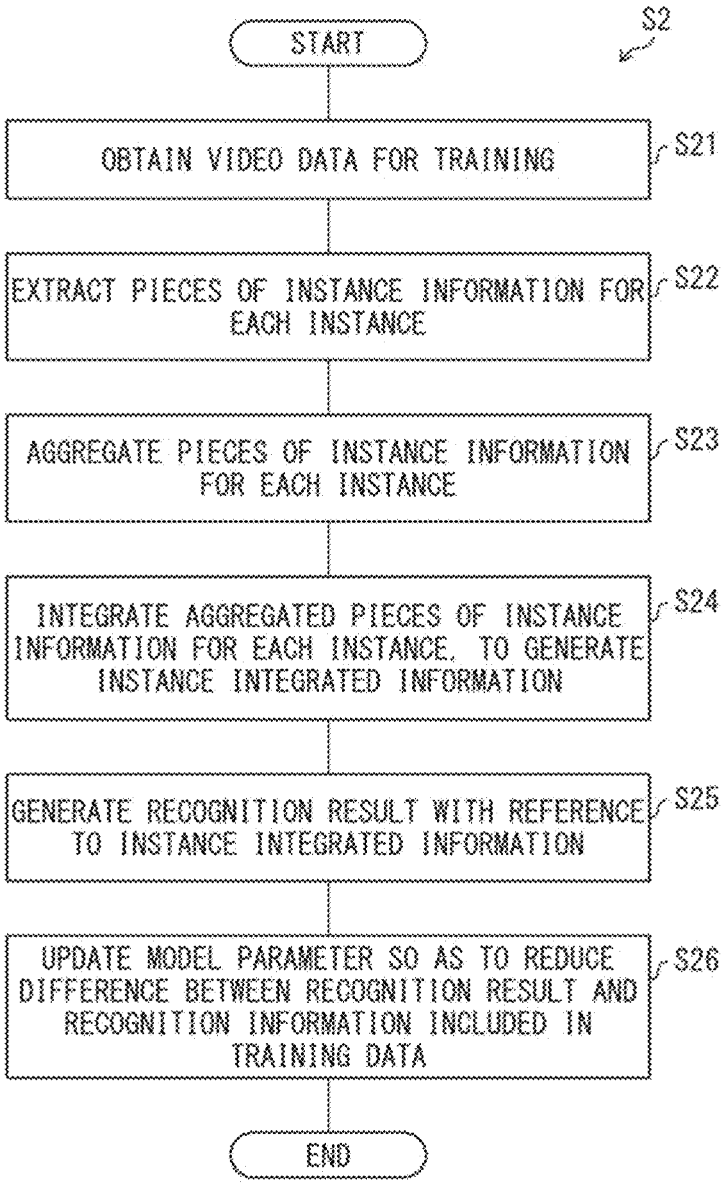
FIG. 12 is a flowchart illustrating the flow of an information processing method in accordance with the third example embodiment of the present invention.

The following description will discuss the flow of a training process carried out by the information processing apparatus 1B configured as described in the foregoing, with reference to FIG. 12. FIG. 12 is a flowchart illustrating the flow of the training process.

(Step S21)

In step S21, the training section 16 inputs, into the extraction section 11, video data for training VDL included in the training data TD.

(Step S22)

In step S22, the extraction section 11 extracts a plurality of pieces of instance information for each of at least one instance included in the video data for training VDL inputted in step S21.

(Step S23)

In step S23, the aggregation section 12 aggregates the plurality of pieces of instance information for each instance.

(Step S24)

In step S24, the integration section 13 integrates, for each instance, the plurality of pieces of instance information aggregated in step S23, to generate instance integrated information.

(Step S25)

In step S25, the recognition section 14 generates a recognition result on at least one of the at least one instance, with reference to the instance integrated information generated in step S24.

(Step S26)

In step S26, the training section 16 updates a model parameter MP such that the difference between the recognition result generated in step S25 and recognition information RI included in the training data TD is reduced. In updating the model parameter MP, one or both of a parameter of an integration model for use by the integration section 13 and a parameter of a recognition model for use by the recognition section 14 are updated.

In this way, the training process illustrated in FIG. 12 ends.

In the foregoing training process, training may be carried out by appropriately adjusting a hyperparameter.

<Example Advantage of Information Processing Apparatus 1B>

As described in the foregoing, the information processing apparatus 1B in accordance with the present example embodiment employs a configuration in which one or both of the integration means and the recognition means are trained with reference to training data including a plurality of pairs of a video and recognition information associated with at least one of at least one instance included in the video.

With this configuration, it is possible to train one or both of the integration means and the recognition means with reference to the training data. Therefore, in addition to the example advantage of the information processing apparatus 1 in accordance with the first example embodiment, it is possible to improve the recognition accuracy of the recognition process.

The information processing apparatus 1B in accordance with the present example embodiment employs a configuration in which a video included in the training data is inputted, and one or both of a parameter of an integration model and a parameter of a recognition model are updated in such a manner as to reduce a difference between a generated recognition result and recognition information included in the training data.

With this configuration, one or both of the parameter of the integration model and the parameter of the recognition model are updated in such a manner as to output a recognition result adapted to the recognition information. Therefore, in addition to the example advantage of the information processing apparatus 1 in accordance with the first example embodiment, it is possible to improve the recognition accuracy of the recognition process by using the updated model parameter.

Software Implementation Example

Some or all of the functions of each of the information processing apparatuses 1, 1A, and 1B may be implemented by hardware such as an integrated circuit (IC chip), or may be alternatively implemented by software.

Figure 13:
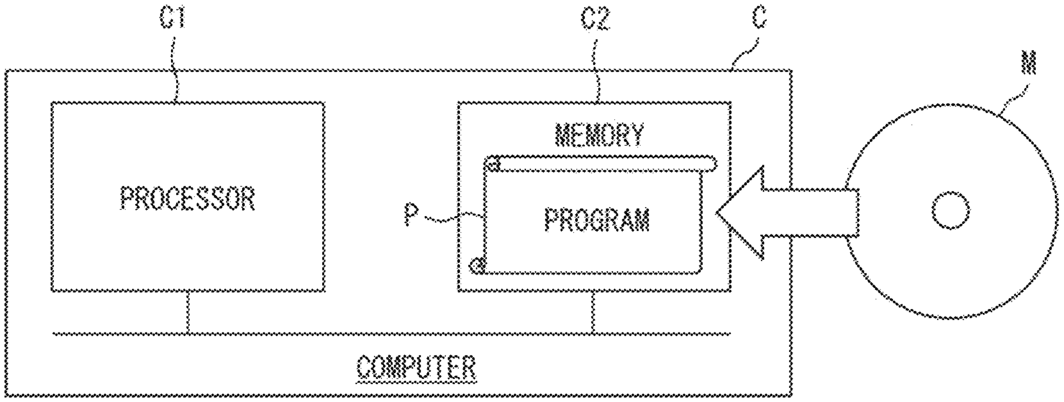
FIG. 13 is a block diagram illustrating an example of the hardware configuration of the apparatus in accordance with each of the example embodiments of the present invention.

In the latter case, the information processing apparatuses 1, 1A, and 1B are implemented by, for example, a computer that executes instructions of a program that is software implementing the foregoing functions. FIG. 13 illustrates an example of such a computer (hereinafter, referred to as "computer C"). The computer C includes at least one processor C1 and at least one memory C2. The memory C2 stores a program P for causing the computer C to operate as the information processing apparatuses 1, 1A, and 1B. The processor C1 of the computer C retrieves the program P from the memory C2 and executes the program P, so that the functions of the information processing apparatuses 1, 1A, and 1B are implemented.

As the processor C1, for example, it is possible to use a central processing unit (CPU), a graphic processing unit (GPU), a digital signal processor (DSP), a micro processing unit (MPU), a floating point number processing unit (FPU), a physics processing unit (PPU), a microcontroller, or a combination of these. The memory C2 can be, for example, a flash memory, a hard disk drive (HDD), a solid state drive (SSD), or a combination of these.

Note that the computer C can further include a random access memory (RAM) in which the program P is loaded when the program P is executed and in which various kinds of data are temporarily stored. The computer C may further include a communication interface via which data is transmitted to and received from another apparatus. The computer C can further include an input/output interface for connecting input-output apparatuses such as a keyboard, a mouse, a display and a printer.

The program P can be stored in a non-transitory tangible storage medium M which is readable by the computer C. The storage medium M can be, for example, a tape, a disk, a card, a semiconductor memory, a programmable logic circuit, or the like. The computer C can obtain the program P via the storage medium M. The program P can be transmitted via a transmission medium. The transmission medium can be, for example, a communications network, a broadcast wave, or the like. The computer C can obtain the program P also via such a transmission medium.

Additional Remark 1

The present invention is not limited to the above example embodiments, but may be altered in various ways by a skilled person within the scope of the claims. For example, the present invention also encompasses, in its technical scope, any example embodiment derived by appropriately combining technical means disclosed in the foregoing example embodiments.

Additional Remark 2

Some of or all of the foregoing example embodiments can also be described as below. Note, however, that the present invention is not limited to the following supplementary notes.

Supplementary Note 1

An information processing apparatus including:

extraction means for extracting a plurality of pieces of instance information for each of at least one instance included in an input video;

aggregation means for aggregating the plurality of pieces of instance information for each instance;

integration means for integrating, for each instance, the plurality of pieces of instance information aggregated by the aggregation means, to generate instance integrated information; and recognition means for generating a recognition result on at least one of the at least one instance with reference to the instance integrated information generated by the integration means.

Supplementary Note 2

The information processing apparatus according to Supplementary note 1, wherein the integration means includes: at least one conversion layer that applies a conversion process to each piece of instance information; and at least one integration layer that integrates the pieces of instance information which have been subjected to the conversion process.

Supplementary Note 3

The information processing apparatus according to Supplementary note 2, wherein the integration means adds a significance to each piece of instance information which has been subjected to the conversion process by the at least one conversion layer, and the at least one integration layer integrates the pieces of instance information by means of the significance.

Supplementary Note 4

The information processing apparatus according to Supplementary note 2, wherein the integration means includes, as the at least one conversion layer, a plurality of conversion layers being arranged in series and each applying a conversion process to each piece of instance information, and the at least one integration layer includes at least one integration layer that adds a significance to each piece of instance information which has been subjected to the conversion process by the conversion layers, and integrates the pieces of instance information by means of the significance.

Supplementary Note 5

The information processing apparatus according to any one of Supplementary notes 1 to 4, wherein the recognition means generates a recognition result on an action of a human among the at least one instance.

Supplementary Note 6

The information processing apparatus according to Supplementary note 5, wherein the recognition means applies different identification processes to human-associated instance integrated information and object-associated instance integrated information associated, among the at least one instance.

Supplementary Note 7

The information processing apparatus according to any one of Supplementary notes 1 to 6, wherein the aggregation means adds attribute information to each of the at least one instance.

Supplementary Note 8

The information processing apparatus according to any one of Supplementary notes 1 to 7, further including a training section that trains one or both of the integration means and the recognition means with reference to training data including a plurality of pairs of a video and recognition information associated with at least one of at least one instance included in the video.

Supplementary Note 9

The information processing apparatus according to Supplementary note 8, wherein the training section inputs a video included in the training data into the extraction means, and updates one or both of a parameter of an integration model for use by the integration means and a parameter of a recognition model for use by the recognition means in such a manner as to reduce a difference between the recognition result generated by the recognition means and recognition information included in the training data.

Supplementary Note 10

An information processing method including:

extracting a plurality of pieces of instance information for each of at least one instance included in an input video;

aggregating the plurality of pieces of instance information for each instance;

integrating, for each instance, the plurality of pieces of instance information aggregated, to generate instance integrated information; and generating a recognition result on at least one of the at least one instance with reference to the generated instance integrated information.

Supplementary Note 11

A program for causing a computer to function as an information processing apparatus including:

extraction means for extracting a plurality of pieces of instance information for each of at least one instance included in an input video;

aggregation means for aggregating the plurality of pieces of instance information for each instance;

integration means for integrating, for each instance, the plurality of pieces of instance information aggregated by the aggregation means, to generate instance integrated information; and recognition means for generating a recognition result on at least one of the at least one instance with reference to the instance integrated information generated by the integration means.

Additional Remark 3

Furthermore, some of or all of the above example embodiments can also be expressed as below.

An information processing apparatus including at least one processor, the at least one processor carrying out: an extraction process of extracting a plurality of pieces of instance information for each of at least one instance included in an input video; an aggregation process of aggregating the plurality of pieces of instance information for each instance; an integration process of integrating, for each instance, the plurality of pieces of instance information aggregated, to generate instance integrated information; and a recognition process of generating a recognition result on at least one of the at least one instance with reference to the generated instance integrated information.

Note that the information processing apparatus may further include a memory, which may store therein a program for causing the at least one processor to carry out the extraction process, the aggregation process, the integration process, and the recognition process. Alternatively, the program may be stored in a computer-readable, non-transitory, tangible storage medium.

REFERENCE SIGNS LIST

1, 1A, 1B Information processing apparatus
11 Extraction section
12 Aggregation section
13 Integration section
14 Recognition section
15 Output section
16 Training section
130 Conversion layer
131 Integration layer

What is claimed is:

1. An information processing apparatus comprising at least one processor, the at least one processor carrying out:

an extraction process of extracting a plurality of pieces of instance information for each of at least one instance included in an input video, wherein the plurality of pieces of instance information comprises a rectangular information that is a rectangle surrounding the instance, a pose information including a skeletal frame of the instance and a segmentation information that indicates the surrounding environment of the instance;

an aggregation process of aggregating the plurality of pieces of instance information for each instance;

an integration process of integrating for each instance, the plurality of pieces of instance information aggregated by the aggregation process, to generate instance integrated information; and a recognition process of generating a recognition result on at least one of the at least one instance with reference to the instance integrated information generated by the integration process;

wherein, in the aggregation process, the plurality of pieces of instance information are aggregated to an instance, by referring to the relationship between the position in the image of the segmentation included in the segmentation information, and the position of a rectangle included in the rectangular information and the position of a skeletal frame included in the pose information.

2. The information processing apparatus according to claim 1, wherein the integration means comprises: at least one conversion layer that applies a conversion process to each piece of instance information; and at least one integration layer that integrates the pieces of instance information which have been subjected to the conversion process.

3. The information processing apparatus according to claim 2, wherein the integration means adds a significance to each piece of instance information which has been subjected to the conversion process by the at least one conversion layer, and the at least one integration layer integrates the pieces of instance information by means of the significance.

4. The information processing apparatus according to claim 2, wherein the integration means comprises, as the at least one conversion layer, a plurality of conversion layers being arranged in series and each applying a conversion process to each piece of instance information, and the at least one integration layer comprises at least one integration layer that adds a significance to each piece of instance information which has been subjected to the conversion process by the conversion layers, and integrates the pieces of instance information by means of the significance.

5. The information processing apparatus according to claim 1, wherein the recognition process generates a recognition result on an action of a human among the at least one instance.

6. The information processing apparatus according to claim 5, wherein the recognition process applies different identification processes to human-associated instance integrated information and object-associated instance integrated information associated, among the at least one instance.

7. The information processing apparatus according to claim 1, wherein the aggregation process adds attribute information to each of the at least one instance.

8. The information processing apparatus according to claim 1, wherein the at least one processor further carries out a training process that trains one or both of the integration means and the recognition means with reference to training data including a plurality of pairs of a video and recognition information associated with at least one of at least one instance included in the video.

9. The information processing apparatus according to claim 8, wherein the training process inputs a video included in the training data into the extraction process, and updates one or both of a parameter of an integration model for use by the integration means and a parameter of a recognition model for use by the recognition means in such a manner as to reduce a difference between the recognition result generated by the recognition means and recognition information included in the training data.

10. An information processing method comprising:

extracting a plurality of pieces of instance information for each of at least one instance included in an input video, wherein the plurality of pieces of instance information comprises a rectangular information that is a rectangle surrounding the instance, a pose information including a skeletal frame of the instance and a segmentation information that indicates the surrounding environment of the instance;

aggregating the plurality of pieces of instance information for each instance;

integrating, for each instance, the plurality of pieces of instance information aggregated, to generate instance integrated information; and generating a recognition result on at least one of the at least one instance with reference to the generated instance integrated informations, and wherein, in the aggregation process, the plurality of pieces of instance information are aggregated to an instance, by referring to the relationship between the position in the image of the segmentation included in the segmentation information, and the position of a rectangle included in the rectangular information and the position of a skeletal frame included in the pose information.

11. A non-transitory storage medium storing a program for causing a computer to carry out:

an extraction process of extracting a plurality of pieces of instance information for each of at least one instance included in an input video, wherein the plurality of pieces of instance information comprises a rectangular information that is a rectangle surrounding the instance, a pose information including a skeletal frame of the instance and a segmentation information that indicates the surrounding environment of the instance;

an aggregation process of aggregating the plurality of pieces of instance information for each instance;

an integration process of integrating, for each instance, the plurality of pieces of instance information aggregated by the aggregation process, to generate instance integrated information; and a recognition process of generating a recognition result on at least one of the at least one instance with reference to the instance integrated information generated by the integration process, and wherein, in the aggregation process, the plurality of pieces of instance information are aggregated to an instance, by referring to the relationship between the position in the image of the segmentation included in the segmentation information, and the position of a rectangle included in the rectangular information and the position of a skeletal frame included in the pose information.

* * * * *